US012762013B2

(12) United States Patent
Schaefer et al.

(10) Patent No.: US 12,762,013 B2
(45) Date of Patent: Oct. 13, 2026

(54) HOST ERROR CONTROL MATRIX

(71) Applicant: Micron Technology, Inc., Boise, ID (US)

(72) Inventors: Scott E. Schaefer, Boise, ID (US); Joseph G. Garofalo, Palo Alto, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/775,974

(22) Filed: Jul. 17, 2024

(65) Prior Publication Data

US 2025/0077345 A1 Mar. 6, 2025

Related U.S. Application Data

(60) Provisional application No. 63/579,147, filed on Aug. 28, 2023.

(51) Int. Cl.
*G06F 11/10* (2006.01)

(52) U.S. Cl.
CPC ................................ *G06F 11/1044* (2013.01)

(58) Field of Classification Search
CPC . G06F 11/1044; G06F 11/0775; G06F 11/079
USPC ........................................................ 714/6.21
See application file for complete search history.

(56) References Cited

U.S. PATENT DOCUMENTS 5,790,570 A * 8/1998 Heegard ............... H04L 1/0065 714/755
2002/0027684 A1* 3/2002 Ait Sab ................... H04J 14/02 398/91
2012/0198309 A1* 8/2012 Alves ...................... G06F 11/10 714/763

OTHER PUBLICATIONS

ATP Electronics: "What is Error detection correction, LDPC, BCH, Reed-Solomon Algorithm?" (Year: 2019).*
Wikipedia "data buffer" page, retrieved from https://en.wikipedia.org/wiki/Data_buffer (2026) (Year: 2026).*

* cited by examiner

*Primary Examiner* — Yair Leibovich
(74) *Attorney, Agent, or Firm* — Holland & Hart LLP

(57) ABSTRACT

Methods, systems, and devices for host error control matrix are described. A host device may implement a parity check matrix for generating error control information with a relatively low likelihood that a multi-bit error in a codeword associated with the error control information is mistaken for a single-bit error. The host device may implement a parity check matrix patterned such that when the error control information is generated, there is a relatively low likelihood that an error code resulting from a comparison of the error control information will yield an indication of a single-bit error when a multi-bit error occurs. For example, the host device may compare first error control information generated for a codeword and transmitted to a memory device with second error control information generated after receiving the codeword from the memory device, and generate an error code using the results of the comparison.

20 Claims, 7 Drawing Sheets

HOST ERROR CONTROL MATRIX

CROSS REFERENCE

The present Application for Patent claims priority to U.S. Patent Application No. 63/579, 147 by Schaefer et al., entitled "HOST ERROR CONTROL MATRIX," filed Aug. 28, 2023, which is assigned to the assignee hereof, and which is expressly incorporated by reference in its entirety herein.

TECHNICAL FIELD

The following relates to one or more systems for memory, including host error control matrix.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
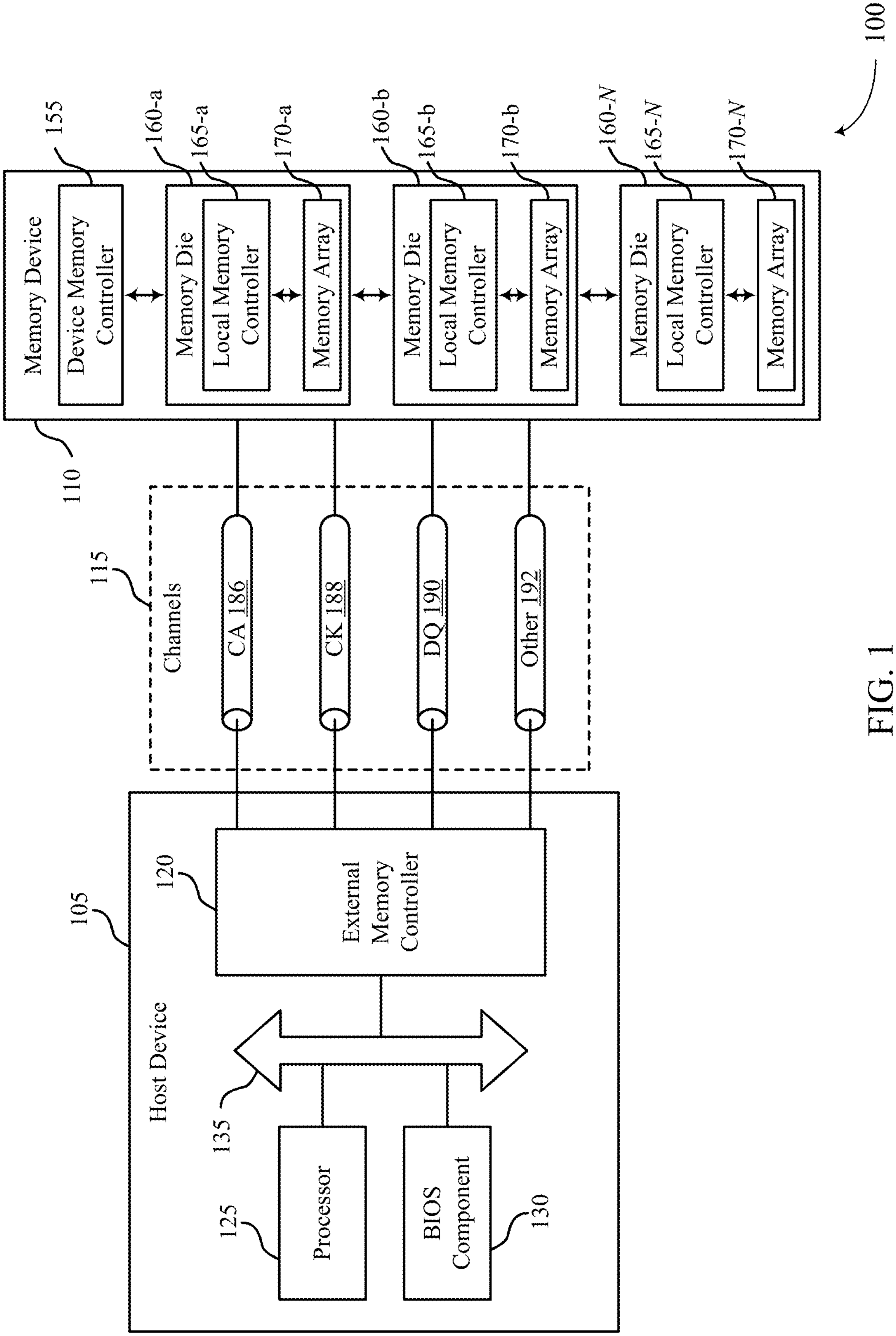
FIG. 1 illustrates an example of a system that supports host error control matrix in accordance with examples as disclosed herein.

A host device may be configured to communicate with a memory device such that data and error control information (e.g., parity bits) may be transmitted between the host device and the memory device for use in error detection and correction. For example, the host device may compare error control information transmitted and received from the memory device to determine whether errors are present in the data associated with the error control information. The host device may generate an error code to indicate a quantity of errors in the data based on comparing the transmitted and received error control information. In some cases, the error code may indicate a multi-bit error in the data (e.g., 3 or more bit errors), however the error code may be interpreted (e.g., by the host device) as indicating a single-bit error in the data (e.g., 1 bit error) due to overlap between the error codes for multi-bit errors and single-bit errors (e.g., aliasing). In some such cases, the host system may correct the interpreted single-bit error, thereby introducing an additional error into the data.

In accordance with examples as described herein, a host device may implement a parity check matrix (e.g., an H-matrix) for generating error control information with a reduced likelihood that a multi-bit error is mistaken for a single-bit error. For example, the host device may implement a parity check matrix patterned such that when the error control information is generated, there is a relatively lower likelihood that an error code resulting from a comparison of the error control information will yield an indication of a single-bit error when a multi-bit error occurs. In some cases, the host device may generate first error control information for data using the parity check matrix, and transmit the data and the first error control information to a memory device. The memory device may transmit the data and the first error control information back to the host device, where the host device may generate second error control information for the received data using the parity check matrix. The host device may compare the first error control information with the second error control information and generate the error code using the results of the comparison. In some such cases, the error code generated as a result of using the parity check matrix may support correction of 100% of single bit errors, detection of 100% of double-bit errors, detection of at least 99.1% of triple bit errors, and detection of at least 99.5% of remaining multiple bit errors. Thus, implementing the parity check matrix as described herein may reduce overlap between error codes, and improve error detection for multi-bit errors, among other advantages.

Features of the disclosure are initially described in the context of a system as described with reference to FIG. 1. Features of the disclosure are described in the context of an error correction diagram, parity check matrices, and a detection results graph as described with reference to FIGS. 2 through 5. These and other features of the disclosure are further illustrated by and described with reference to an apparatus diagram and flowcharts that relate to host error control matrix as described with reference to FIGS. 6 and 7.

FIG. 1 illustrates an example of a system 100 that supports host error control matrix in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

In accordance with examples as described herein, the host device 105 may implement a parity check matrix (e.g., an H-matrix) for generating error control information with a reduced likelihood that an error code indicating a multi-bit error is mistaken for a single-bit error. For example, the host device 105 may implement a parity check matrix patterned such that when the error control information is generated, there is a relatively lower likelihood that an error code resulting from a comparison of the error control information will yield an indication of a single-bit error when a multi-bit error occurs. In some cases, the host device 105 may generate first error control information for data using the parity check matrix, and transmit the data and the first error control information to the memory device 110. The memory device 110 may transmit the data and the first error control information back to the host device 105, where the host device 105 may generate second error control information for the received data using the parity check matrix. The host device 105 may compare the first error control information with the second error control information and generate the error code using the results of the comparison. In some such cases, the error code generated as a result of using the parity check matrix may support correction of 100% of single bit errors, detection of 100% of double-bit errors, and detection of at least 99.1% of triple bit errors. Thus, implementing the parity check matrix as described herein may reduce overlap between error codes, and improve error detection for multi-bit errors, among other advantages.

In addition to applicability in memory systems described herein, techniques that support a host error control matrix may be generally implemented to improve security and/or authentication features of various electronic devices and systems. As the use of electronic devices for handling private, user, or other sensitive information has become even more widespread, electronic devices and systems have become the target of increasingly frequent and sophisticated attacks. Further, unauthorized access or modification of data in security-critical devices such as vehicles, healthcare devices, and others may be especially concerning. Implementing the techniques described herein may improve the security of electronic devices and systems by reducing a likelihood that a multi-bit error is mistaken for a single-bit error, thereby increasing error detection and correction capabilities of the electronic devices and systems, and preventing or mitigating unauthorized access to data or other information, among other benefits.

Figure 2:
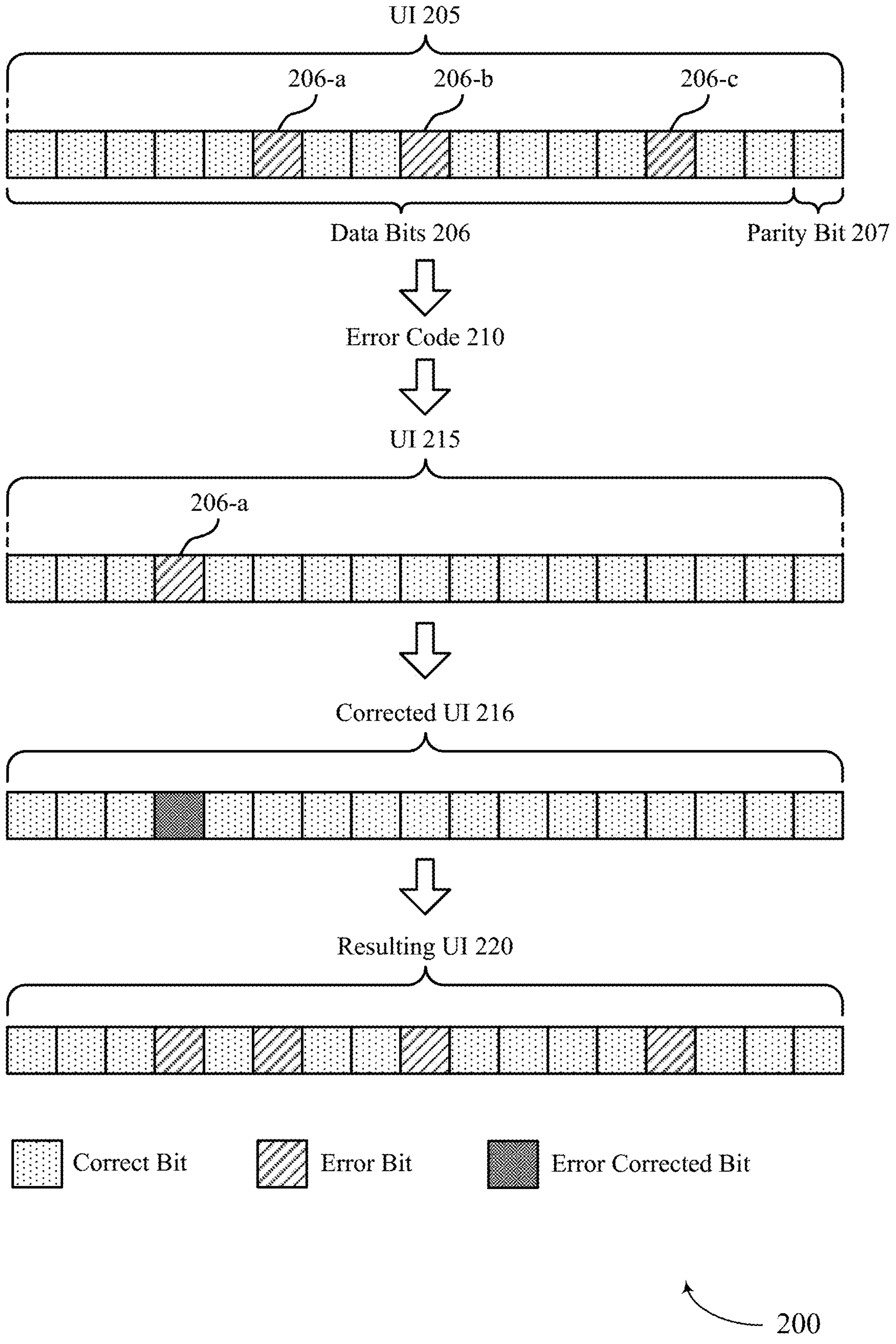
FIG. 2 illustrates an example of an error correction diagram that supports host error control matrix in accordance with examples as disclosed herein.

FIG. 2 illustrates an example of an error correction diagram 200 that supports host error control matrix in accordance with examples as disclosed herein. The error correction diagram 200 may implement aspects or operations of a system 100, as described with reference to FIG. 1. For example, the error correction diagram 200 may depict operations at a host device, which may be an example of a host device 105, as described with reference to FIG. 1. The error correction diagram 200 illustrates an example of a situation in which an error code 210 may be generated after detecting a multi-bit error, yet the host device may interpret the error code 210 as a single-bit error.

The host device may be configured to communicate with a memory device (e.g., a volatile memory device) coupled with the host device, such that a codeword may be transmitted between the host device and the memory device. The codeword may include a quantity of unit intervals (UIs) 205 (e.g., 16) transmitted between the host device and the memory device. In some cases, error control information may be used to protect data bits transmitted between the host device and the memory device. If multiple signal paths are used to communicate symbols during a single UI in parallel, each UI 205 may include a quantity of data bits 206 (e.g., payload data bits) associated with host data (e.g., data for reading or writing to the memory device). In some cases, one or more parity bits 207 (e.g., error control information) associated with supporting error detection and correction may be communicated concurrently with communicating data bits 206. For example, the UI 205 may include 16 data bits 206 and 1 parity bit 207. Thus, a total of 256 data bits 206 and 16 parity bits 207 may be transmitted over 16 UIs. In other examples, data bits 206 and parity bits 207 may be transmitted in different bursts such that in a single UI 205 the data bits 206 may be communicated and then in a separate UE 205 the parity bits 207 may be communicated. In yet other examples, parity bits 207 may not be communicated between the host device and the memory device and instead the parity bits may be generated by and stored by its respective device (e.g., either the host device or the memory device). In some implementations, the 1 parity bit 207 may support error detection and correction of the 16 data bits 206 associated with the UI 205, or error detection and correction of data bits 206 associated with another one of the 16 UIs 205. The host device and the memory device may support a dynamic link error control code (ECC) protocol (DLEP) configuration of channels between the host device and the memory device, such that the data bits 206 of the UI 205 may be transmitted between the host device and the memory device via data channels, and the one or more parity bits 207 of the UI 205 may be transmitted between the host device and the memory device via a dedicated error control channel.

In some cases, the host device may include an error control engine configured to generate the one or more parity bits 207 associated with the data bits 206 and/or associated with the UI 205. The error control engine may generate the one or more parity bits 207 (e.g., first error control information) using a parity check matrix (e.g., an H-matrix). After the one or more parity bits 207 have been generated using the parity check matrix, the host device may transmit the data bits 206 as part of one or more UIs 205 (e.g., 16 UIs) to the memory device. In some cases, the host device may be configured such that the error control engine is coupled with the dedicated error control channel, supporting transmission of the one or more parity bits 207 directly to and/or from the error control engine via the dedicated error control channel. The one or more data bits 206 received from the host device may be stored to the memory device. The one or more data bits 206 may be transmitted back to the host device (e.g., via the data channels and the dedicated error control channel) from the memory device, where the error control engine may generate one or more additional parity bits 207 (e.g., second error control information) corresponding to the data bits 206 received from the memory device. The error control engine may generate the one or more additional parity bits 207 using the parity check matrix. The error control engine may compare the one or more parity bits 207 transmitted to the memory device with the one or more additional parity bits 207 generated based on the UIs 205 received from the memory device.

The error control engine may detect one or more errors in the one or more UIs 205 based on comparing the one or more parity bits 207 with the one or more additional parity bits 207. The error control engine may generate an error code 210 which may indicate the one or more errors in the one or more UIs 205 and addresses of the one or more errors within the one or more UIs 205. The host device may use the error code 210 to correct or record the one or more errors within the one or more UIs 205. For example, the host device may be capable of correcting single bit errors (e.g., one error in the one or more UIs) and detecting multi-bit errors (e.g., two or more errors in the one or more UIs). In some implementations, correcting a single bit error may include determining which bit (e.g., data bit 206 or parity bit 207) of the one or more UIs 205 is responsible for the error and changing a logic value associated with the bit. For example, correcting a single bit error may include determining an error at a first data bit 206 and flipping a logic value of the first data bit 206 (e.g., from a 0 to a 1, from a 1 to a 0). However, in some implementations, a multi-bit error may be detected but not corrected, due to an inability to determine exact locations of the errors in the one or more UIs 205.

In some cases, as illustrated in FIG. 2, the error control engine may detect a multi-bit error (e.g., three errors) in the one or more UIs (e.g., on a single UI error control basis, or as part of performing error control for the 16 UIs). For example, the error control engine may detect the multi-bit error in the UI 205 based on comparing a parity bit 207 generated before transmitting the UI 205 to the memory device with an additional parity bit 207 generated after receiving the UI 205 from the memory device. In some such cases, the parity bit 207 and the additional parity bit 207 may have been generated using a traditional parity check matrix (e.g., as used in prior implementations). The error control engine may generate the error code 210 to indicate the multi-bit error in the UI 205 to the host device. However, in some cases, the error code 210 may overlap with an error code indicating a single-bit error (e.g., potentially at a different position than the three errors), as depicted in a UI 215. Thus, the host device may interpret the error code 210 as indicating a single-bit error rather than the multi-bit error that was detected by the error control engine. For example, three errors may exist at a first data bit 206-*a*, a second data bit 206-*b*, and a third data bit 206-*c*, as shown in the UI 205, yet the host device may interpret from the error code 210 that a single error exists at a fourth data bit 206-*d*, as shown in the UI 215.

In some implementations, the host device may use the error code 210 to correct the interpreted single-bit error at the UI 215 (e.g., due to a capability of the host device to correct a single-bit error), despite the multi-bit error being detected (e.g., potentially at different positions in the codeword) in the UI 205. For example, correcting the interpreted single-bit error may result in a corrected UI 216, as interpreted by the host device. However, in some such implementations, correcting the interpreted single-bit error may result in introducing another error into the UI 205. For example, the host device may flip a logic value at the fourth data bit 206-*d*, as shown in the corrected UI 216, thereby causing the UI 205 to have four errors at the first data bit 206-*a*, the second data bit 206-*b*, the third data bit 206-*c*, and the fourth data bit 206-*d*, despite the fourth data bit 206-*d* not including an actual error, as shown in a resulting UI 220. Therefore, rather than detecting the multi-bit error, as shown in the UI 205, the host device may introduce an additional error, further propagating the multi-bit error, as shown in the resulting UI 220.

In some cases, being incapable of correctly detecting multi-bit errors may be disadvantageous. For example, in automotive applications, it may be desirable to have a relatively high error detection rate (e.g., relatively high diagnostic coverage) due to a relatively high quantity of operational cycles. In some such applications, if a multi-bit error is not correctly detected, the resulting outcome may include risk or damage to an automotive system or a user of the automotive system. Therefore, the relatively high error detection rate may be coupled with the relatively high quantity of operational cycles to ensure proper functionality of the automotive system. Thus, there may be a desire to decrease a likelihood that a multi-bit error is incorrectly detected.

In accordance with examples as described herein, however, the host device may implement an improved parity check matrix (e.g., an H-matrix), which may reduce the likelihood that a multi-bit error is mistaken for a single-bit error. For example, the improved parity check matrix may be patterned such that when the one or more parity bits 207 (e.g., generated prior to transmitting the UI 205 to the memory device) and the one or more additional parity bits 207 (e.g., generated after receiving the UI 205 from the memory device) are generated using the improved parity check matrix, there is a relatively lower likelihood (e.g., compared to previous implementations) that an error code generated based on the results of comparing the one or more parity bits 207 and the one or more additional parity bits 207 will be interpreted by the host device as a single-bit error when a multi-bit error occurs.

For example, the error control engine may generate the one or more parity bits 207 using the improved parity check matrix, and transmit the one or more UIs to the memory device. Then, the memory device may transmit the one or more UIs back to the host device, where the error control engine may generate the one or more additional parity bits 207 using the improved parity check matrix. The error control engine may compare the one or more parity bits 207 with the one or more additional parity bits 207 and generate the error code using the results of the comparison. In some such examples, the error code generated as a result of using the improved parity check matrix to generate the one or more parity bits 207 and the one or more additional parity bits 207 may support correction of 100% of single bit errors, detection of 100% of double-bit errors, and detection of at least 99.1% of triple bit errors (e.g., with or without a parity wrapper). Thus, implementing the improved parity check matrix as described herein may reduce overlap between error codes, resulting in a decreased likelihood of incorrectly detecting a multi-bit error, while also improving error detection for multi-bit errors, among other advantages.

Figure 3:
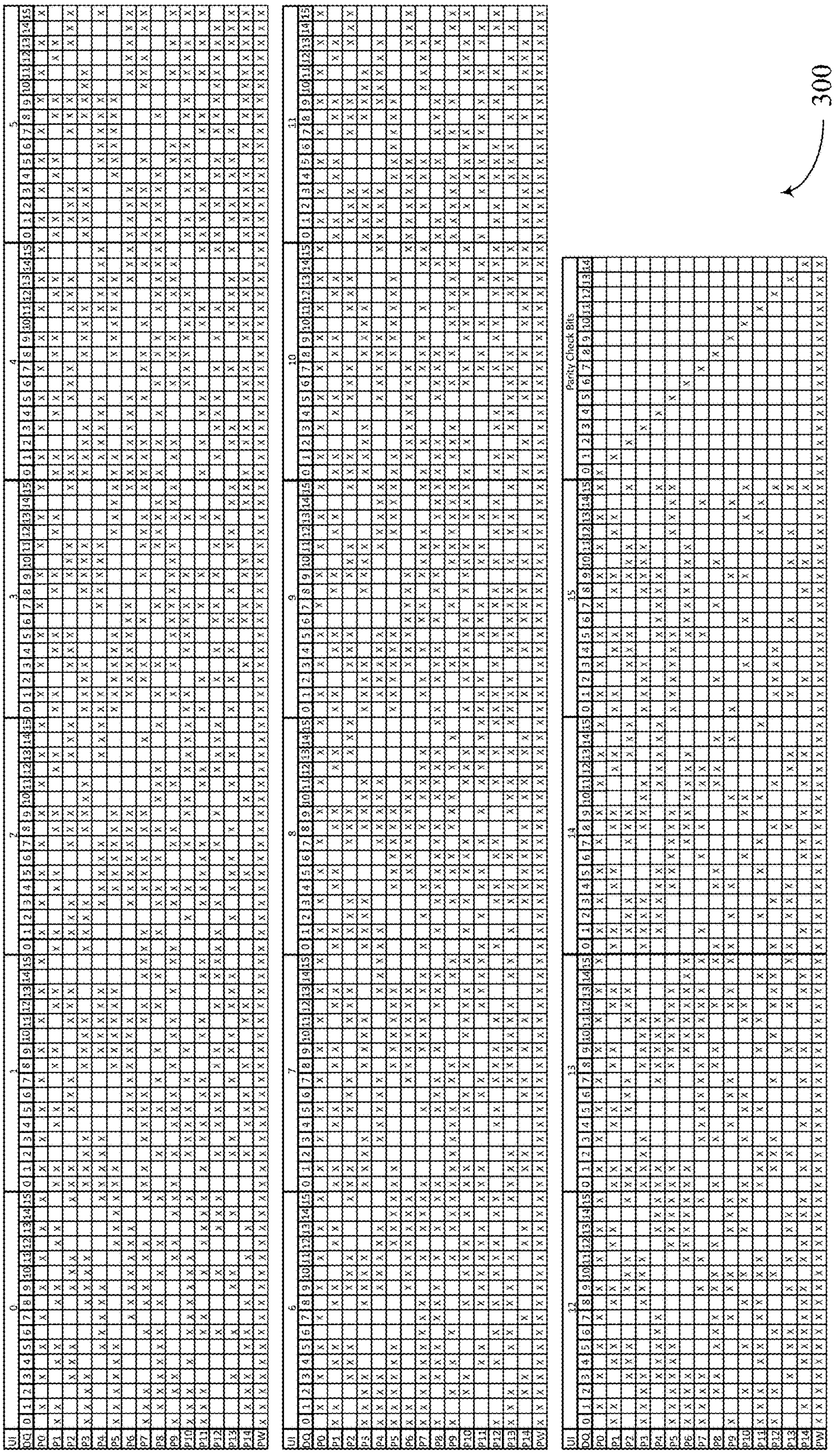
FIG. 3 illustrates an example of a parity check matrix that supports host error control matrix in accordance with examples as disclosed herein.

FIG. 3 illustrates an example of a parity check matrix 300 that supports host error control matrix in accordance with examples as disclosed herein. The parity check matrix 300 may be implemented by a system 100, as described with reference to FIG. 1. Further, the parity check matrix 300 may be an example of a parity check matrix used in the operations described in an error correction diagram 200, as described with reference to FIG. 2. The parity check matrix 300 may be used for generating a codeword (e.g., including one or more UIs) with data bits and parity bits, with a relatively reduced likelihood that multi-bit errors in the codewords are mistaken for single-bit errors.

The parity check matrix 300 may be used to generate a codeword with a quantity of data bits and one or more parity bits, which may be examples of data bits 206 and parity bits 207, as described with reference to FIG. 2. For example, the parity check matrix 300 illustrates a codeword with 16 UIs, each UI comprised of 16 data bits and one parity bit, for a total of 256 data bits, 15 parity bits, and 1 parity wrapper. Each data bit and each parity bit may be configured to store a binary logic value (e.g., 0 or 1). The parity bits may be generated using the parity check matrix 300, however each parity bits may or may not support error detection and correction for the data bits of the corresponding UI.

For example, the parity check matrix 300 illustrates a code that can be applied to 16 bursts of information (e.g., sections numbered 0-15). Each burst of information may include 16 unit intervals (UI) (e.g., columns numbered 0-15), where each UI is configured to communicate the binary logic value 0 (e.g., indicated by a blank cell) or 1 (e.g., indicated by an "X") over 16 channels. The parity bits may include 15 parity bits (e.g., rows numbered P0-P14) and 1 parity wrapper (PW) channel. The parity check matrix 300 also illustrates a parity check bits section including parity bit locations for each data channel and a parity wrapper for the parity check bits. The parity check bits section may be used in conjunction with the burst of information to generate the parity check bits for a given codeword, such that each UI may be generated with 16 data bits and 1 parity bit based on the value and locations of the data bits. Thus, the codeword may illustrate 256 data bits and 15 parity bits, and 1 parity wrapper.

The parity check matrix 300 may be generated using optimization techniques to reduce a likelihood that an error code generated for a multi-bit error in a codeword is mistaken for a single-bit error in a codeword. As described in FIG. 2, an error code may be generated based on identifying one or more errors in a codeword after comparing an initial parity bit for the codeword (e.g., transmitted to a memory device) to an additional parity bit for the codeword (e.g., received from the memory device) and identifying a difference. However, due to generating the initial parity bit and the additional parity bit using the parity check matrix 300, the error codes generated for errors in the codeword may have a relatively reduced overlap for error codes indicating a multi-bit error and error codes indicating a single-bit error. Therefore, there is a reduced likelihood that a multi-bit error may be interpreted as a single-bit error when the parity check matrix 300 is used in error detection.

Figure 4:
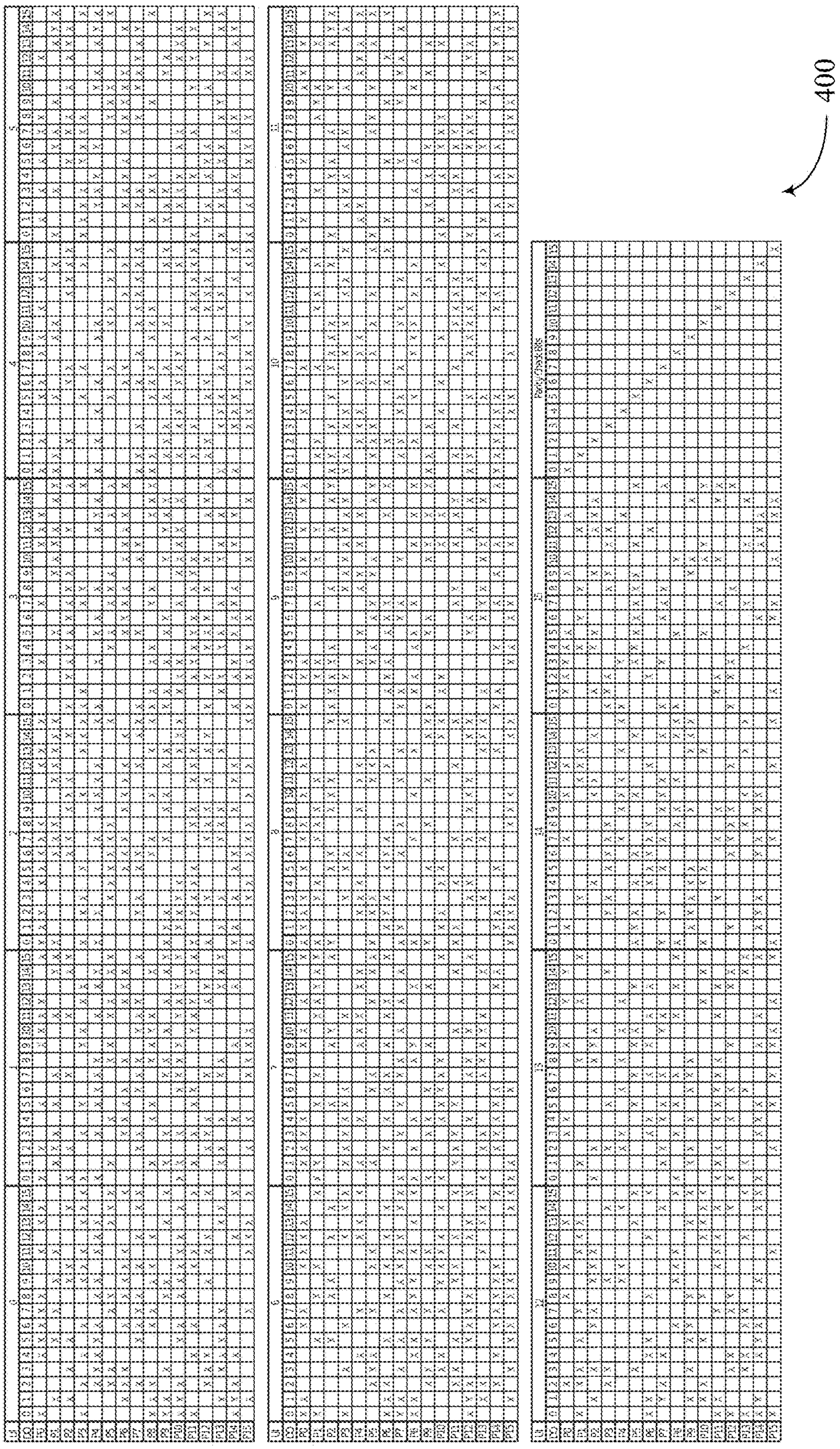
FIG. 4 illustrates an example of a parity check matrix that supports host error control matrix in accordance with examples as disclosed herein.

FIG. 4 illustrates an example of a parity check matrix 400 that supports host error control matrix in accordance with examples as disclosed herein. The parity check matrix 400 may be implemented by a system 100, as described with reference to FIG. 1. Further, the parity check matrix 400 may be an example of a parity check matrix used in the operations described in an error correction diagram 200, as described with reference to FIG. 2. The parity check matrix 400 may be used for generating a codeword with data bits and parity bits, with a relatively reduced likelihood that multi-bit errors in the codewords are mistaken for single-bit errors.

The parity check matrix 400 may be used to generate a codeword with a quantity of data bits and one or more parity bits, which may be examples of data bits 206 and parity bits 207, as described with reference to FIG. 2. For example, the parity check matrix 400 illustrates a codeword with 16 UIs, each UI comprised of 16 data bits and one parity bit. Each data bit and each parity bit may be configured to store a binary logic value (e.g., 0 or 1). The parity bits may be generated using the parity check matrix 400 for a given codeword based on the logic values stored in the data bits of the codeword.

For example, the parity check matrix 400 illustrates a code that defines error detecting logic for the 16 parity bits which detects 100% DBE without requiring use of a parity wrapper. The binary logic value 0 indicates no connection (e.g., indicated by a blank cell) or 1 (e.g., indicated by an "X") indicates connection for each parity bit. For example parity bit P0 is decoded from parity check matrix 400 as follow:

P0=UI0DQ0^UI0DQ4^UI0DQ5^UI0DQ6^UI0DQ7^UI0-DQ8^UI0DQ11^UI0DQ13^UI0DQ14^UI1DQ0^UI1D-Q2^UI1DQ5^UI1DQ9^UI1DQ10^UI1DQ11^UI1DQ-12^UI1DQ15^UI2DQ0^UI2DQ1^UI2DQ2^UI2DQ4^-UI2DQ5^UI2DQ6^UI2DQ7^UI2DQ8^UI2DQ12^UI2-DQ13^UI2DQ15^UI3DQ3^UI3DQ7^UI3DQ11^UI3D-Q12^UI3DQ13^UI4DQ0^UI4DQ2^UI4DQ5^UI4DQ-6^UI4DQ8^UI4DQ9^UI4DQ11^UI4DQ13^UI5DQ5^-UI5DQ3^UI5DQ5^UI5DQ7^UI5DQ8^UI5DQ12^UI6-DQ0^UI6DQ1^UI6DQ6^UI6DQ7^UI6DQ10^UI6DQ-11^UI6DQ12^UI6DQ13^UI7DQ1^UI7DQ2^UI7DQ-3^UI7DQ4^UI7DQ9^UIDQ10^UI7DQ12^UI7DQ15^-UI8DQ0^UI8DQ1^UI8DQ2^UI8DQ3^UI8DQ5^UI8D-Q7^UI8DQ8^UI8DQ10^UI8DQ12^UI9DQ0^UI9DQ-2^UI9DQ3^UI9DQ9^UI9DQ10^UI9DQ12^UI9DQ-14^UI9DQ15^UI10DQ4^UI10DQ7^UI10DQ15^UI11-DQ1^UI11DQ5^UI11DQ10^UI11DQ11^UI11DQ13^-UI12DQ2^UI12DQ8^UI12DQ10^UI12DQ13^UI13D-Q3^UI13DQ4^UI13DQ9^UI13DQ12^UI13DQ14^UI1-4DQ1^UI14DQ7^UI14DQ10^UI14DQ12^UI15DQ1^-UI15DQ2^UI15DQ3^UI15DQ4^UI15DQ5^UI15DQ-9^UI15DQ13; where "^" indicates an XOR function.

The parity check matrix 400 may be generated using optimization techniques to reduce a likelihood that an error code generated for a multi-bit error in a codeword is mistaken for a single-bit error in a codeword. As described in FIG. 2, an error code may be generated based on identifying one or more errors in a codeword after comparing an initial parity bit for the codeword (e.g., transmitted to a memory device) to an additional parity bit for the codeword (e.g., received from the memory device) and identifying a difference. However, due to generating the initial parity bit and the additional parity bit using the parity check matrix 400, the error codes generated for errors in the codeword may have a relatively reduced overlap for error codes indicating a multi-bit error and error codes indicating a single-bit error. Therefore, there is a reduced likelihood that a multi-bit error may be interpreted as a single-bit error when the parity check matrix 400 is used in error detection.

Figure 5:
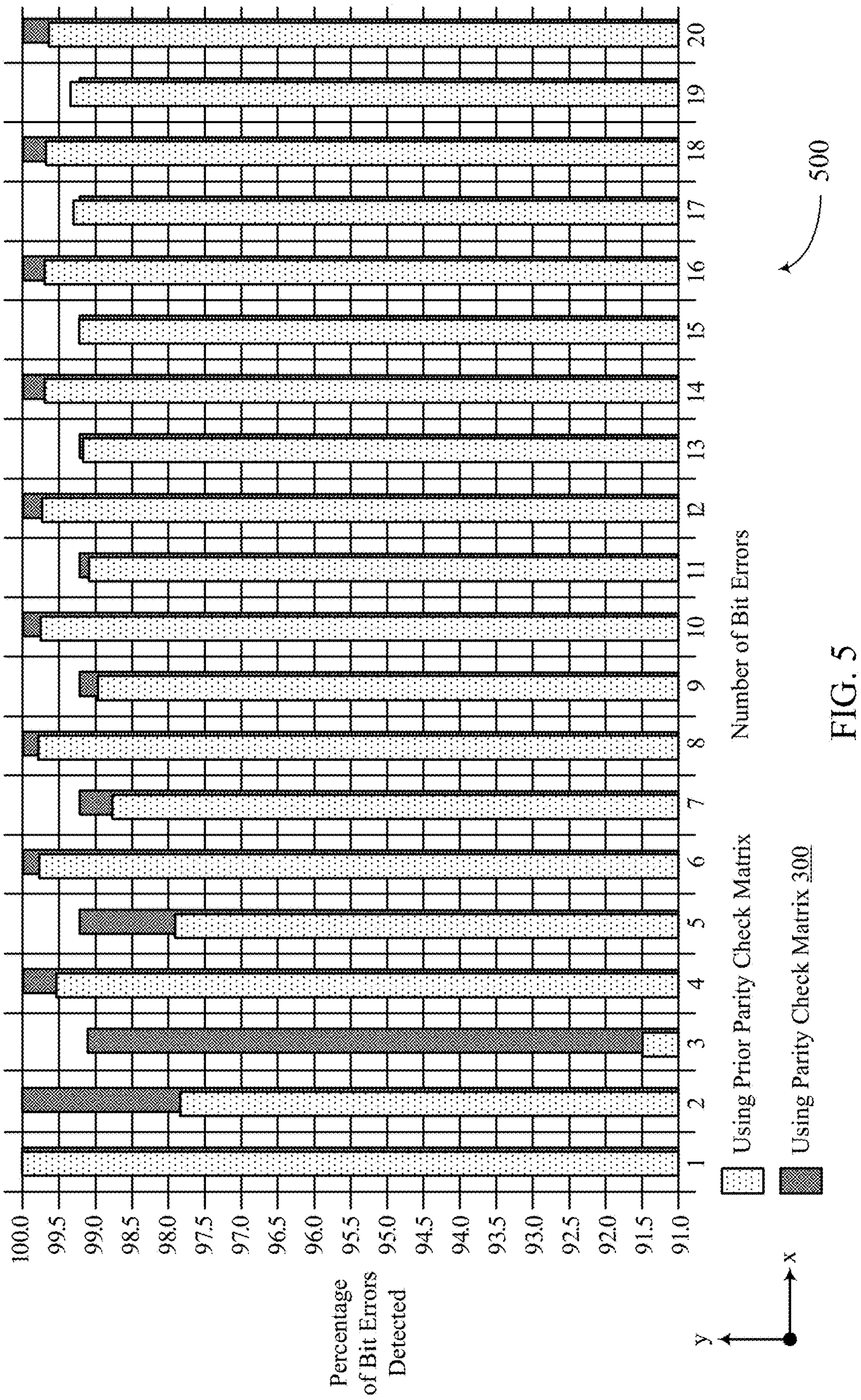
FIG. 5 illustrates an example of a detection results graph that supports host error control matrix in accordance with examples as disclosed herein.

FIG. 5 illustrates an example of a detection results graph 500 that supports host error control matrix in accordance with examples as disclosed herein. The detection results graph 500 may illustrate results of implementing a parity check matrix 300 in a system 100, as described with reference to FIGS. 3 and 1, respectively. For example, the detection results graph 500 may depict results of using the parity check matrix 300 to generate codewords at an error control engine. Specifically, the detection results graph 500 illustrates a difference in error detection capabilities of a system implementing a prior parity check matrix (e.g., generating parity bits for comparison using a prior parity check matrix) and a system implementing the parity check matrix 300 (e.g., generating parity bits for comparison using the parity check matrix 300).

The detection results graph 500 illustrates on a first axis (e.g., the y-axis), a percentage of bit errors detected at a system implementing the prior parity check matrix or the parity check matrix 300 for a number of bits errors represented along a second axis (e.g., the x-axis). For example, the detection results graph 500 illustrates that a system implementing the prior parity check matrix may have a capability of detecting 100% of single-bit errors, and a system implementing the parity check matrix 300 may have a capability of detecting 100% of single-bit errors. In some cases, a system implementing a parity check matrix 400, as describe with reference to FIG. 4, may have a capability of detecting 100% of single-bit errors. Similarly, the detection results graph 500 illustrates that a system implementing the prior parity check matrix may have a capability of detecting 97.8% of double-bit errors, and a system implementing the parity check matrix 300 may have a capability of detecting 100% of double-bit errors. In some cases, a system implementing the parity check matrix 400 may have a capability of detecting 100% of double-bit errors. Further, the detection results graph 500 illustrates that a system implementing the prior parity check matrix may have a capability of detecting 91.5% of triple-bit errors, and a system implementing the parity check matrix 300 may have a capability of detecting 99.18% of triple-bit errors. In some cases, a system implementing the parity check matrix 400 may have a capability of detecting 99.21% of triple-bit errors. In some cases, a system implementing the prior parity check matrix may have a total diagnostic coverage (e.g., capability of detecting any quantity of errors) of 99.54%, however a system implementing the parity check matrix 300 may have a total diagnostic coverage of 99.61%. In some cases, a system implementing the parity check matrix 400 may have a total diagnostic coverage of 99.59%.

In some cases, implementing the parity check matrix 300 (e.g., or the parity check matrix 400) may be advantageous due to a relatively higher detection rate for double-bit errors and triple-bit errors. For example, in automotive applications, it may be desirable to have a relatively high error detection rate (e.g., relatively high diagnostic coverage) due to a relatively high quantity of operational cycles. In some such applications, if a multi-bit error is not correctly detected, the resulting outcome may include risk or damage to an automotive system or a user of the automotive system. Therefore, the relatively high error detection rate of the parity check matrix 300 (e.g., or the parity check matrix 400) may be coupled with the relatively high quantity of operational cycles to ensure proper functionality of the automotive system.

Figure 6:
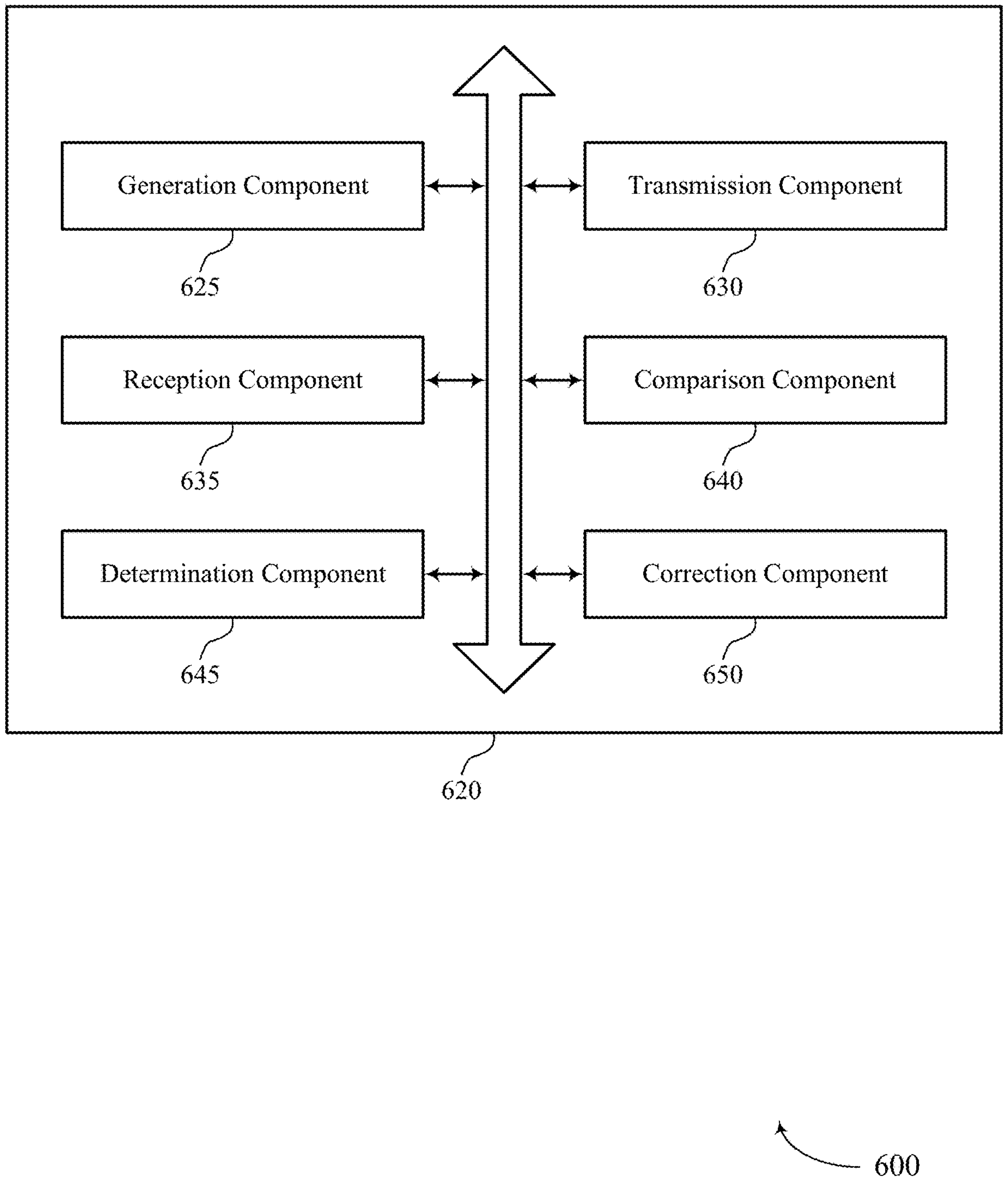
FIG. 6 illustrates a block diagram of a host device that supports host error control matrix in accordance with examples as disclosed herein.

FIG. 6 illustrates a block diagram 600 of a host device 620 that supports host error control matrix in accordance with examples as disclosed herein. The host device 620 may be an example of aspects of a host device as described with reference to FIGS. 1 through 5. The host device 620, or various components thereof, may be an example of means for performing various aspects of host error control matrix as described herein. For example, the host device 620 may include a generation component 625, a transmission component 630, a reception component 635, a comparison component 640, a determination component 645, a correction component 650, or any combination thereof. Each of these components may communicate, directly or indirectly, with one another (e.g., via one or more buses).

The generation component 625 may be configured as or otherwise support a means for generating, by an error control engine of a host device, error control information by applying a parity check matrix to data for storing in a memory device, the parity check matrix for reducing a likelihood that a value of the error control information is associated with both a single-bit error condition and a multiple-bit error condition. The transmission component 630 may be configured as or otherwise support a means for transmitting, to the memory device based at least in part on generating the error control information, the data over one or more data channels and the error control information over a dedicated error control channel. The reception component 635 may be configured as or otherwise support a means for receiving, from the memory device based at least in part on transmitting the data and the error control information, the data over the one or more data channels and the error control information over the dedicated error control channel. In some examples, the generation component 625 may be configured as or otherwise support a means for generating, at the error control engine, second error control information by applying the parity check matrix to the data received from the memory device.

In some examples, the comparison component 640 may be configured as or otherwise support a means for comparing the error control information to the second error control information based at least in part on generating the second error control information.

In some examples, the generation component 625 may be configured as or otherwise support a means for generating an error code based at least in part on comparing the error control information to the second error control information.

In some examples, the determination component 645 may be configured as or otherwise support a means for determining whether an error in the data is a single-bit error or a multiple-bit error based at least in part on a value of the error code.

In some examples, the correction component 650 may be configured as or otherwise support a means for correcting the error in the data based at least in part on determining the error in the data is a single-bit error.

In some examples, the determination component 645 may be configured as or otherwise support a means for determining the error in the data is a multiple-bit error.

In some examples, the error code is configured to indicate a triple-bit error not a single-bit error.

In some examples, the data includes 256 bits and the error control information includes 16 parity bits corresponding to the 256 bits.

Figure 7:
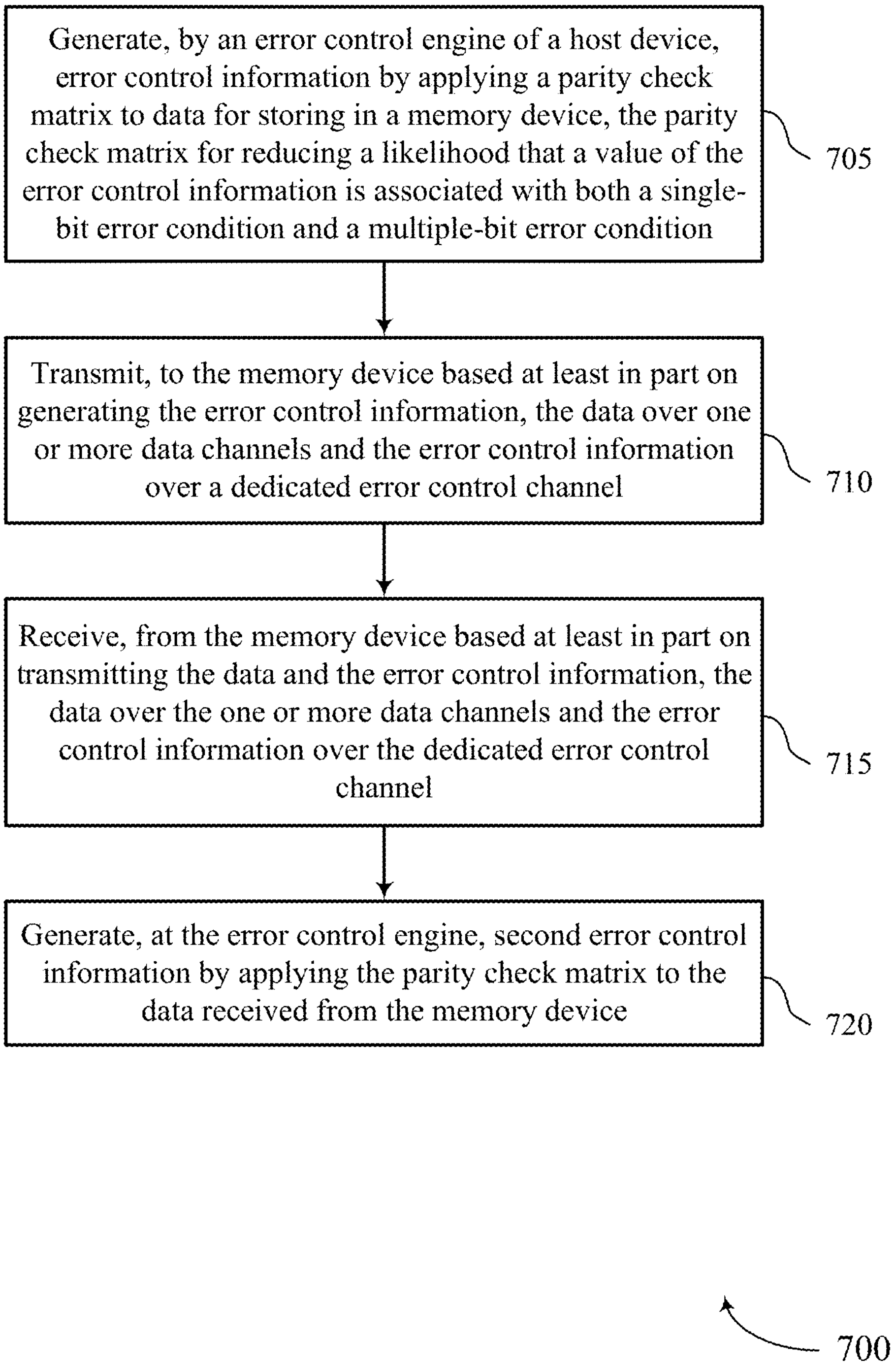
FIG. 7 illustrates a flowchart showing a method or methods that support host error control matrix in accordance with examples as disclosed herein.

FIG. 7 illustrates a flowchart showing a method 700 that supports host error control matrix in accordance with examples as disclosed herein. The operations of method 700 may be implemented by a host device or its components as described herein. For example, the operations of method 700 may be performed by a host device as described with reference to FIGS. 1 through 6. In some examples, a host device may execute a set of instructions to control the functional elements of the device to perform the described functions. Additionally, or alternatively, the host device may perform aspects of the described functions using special-purpose hardware.

At 705, the method may include generating, by an error control engine of a host device, error control information by applying a parity check matrix to data for storing in a memory device, the parity check matrix for reducing a likelihood that a value of the error control information is associated with both a single-bit error condition and a multiple-bit error condition. The operations of 705 may be performed in accordance with examples as disclosed herein. In some examples, aspects of the operations of 705 may be performed by a generation component 625 as described with reference to FIG. 6.

At 710, the method may include transmitting, to the memory device based at least in part on generating the error control information, the data over one or more data channels and the error control information over a dedicated error control channel. The operations of 710 may be performed in accordance with examples as disclosed herein. In some examples, aspects of the operations of 710 may be performed by a transmission component 630 as described with reference to FIG. 6.

At 715, the method may include receiving, from the memory device based at least in part on transmitting the data and the error control information, the data over the one or more data channels and the error control information over the dedicated error control channel. The operations of 715 may be performed in accordance with examples as disclosed herein. In some examples, aspects of the operations of 715 may be performed by a reception component 635 as described with reference to FIG. 6.

At 720, the method may include generating, at the error control engine, second error control information by applying the parity check matrix to the data received from the memory device. The operations of 720 may be performed in accordance with examples as disclosed herein. In some examples, aspects of the operations of 720 may be performed by a generation component 625 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for generating, by an error control engine of a host device, error control information by applying a parity check matrix to data for storing in a memory device, the parity check matrix for reducing a likelihood that a value of the error control information is associated with both a single-bit error condition and a multiple-bit error condition; transmitting, to the memory device based at least in part on generating the error control information, the data over one or more data channels and the error control information over a dedicated error control channel; receiving, from the memory device based at least in part on transmitting the data and the error control information, the data over the one or more data channels and the error control information over the dedicated error control channel; and generating, at the error control engine, second error control information by applying the parity check matrix to the data received from the memory device.

Aspect 2: The method, apparatus, or non-transitory computer-readable medium of aspect 1, further including operations, features, circuitry, logic, means, or instructions, or any combination thereof for comparing the error control information to the second error control information based at least in part on generating the second error control information.

Aspect 3: The method, apparatus, or non-transitory computer-readable medium of aspect 2, further including operations, features, circuitry, logic, means, or instructions, or any combination thereof for generating an error code based at least in part on comparing the error control information to the second error control information.

Aspect 4: The method, apparatus, or non-transitory computer-readable medium of aspect 3, further including operations, features, circuitry, logic, means, or instructions, or any combination thereof for determining whether an error in the data is a single-bit error or a multiple-bit error based at least in part on a value of the error code.

Aspect 5: The method, apparatus, or non-transitory computer-readable medium of aspect 4, further including operations, features, circuitry, logic, means, or instructions, or any combination thereof for correcting the error in the data based at least in part on determining the error in the data is a single-bit error.

Aspect 6: The method, apparatus, or non-transitory computer-readable medium of any of aspects 4 through 5, further including operations, features, circuitry, logic, means, or instructions, or any combination thereof for determining the error in the data is a multiple-bit error.

Aspect 7: The method, apparatus, or non-transitory computer-readable medium of aspect 6, where the error code is configured to indicate a triple-bit error not a single-bit error.

Aspect 8: The method, apparatus, or non-transitory computer-readable medium of any of aspects 1 through 7, where the data includes 256 bits and the error control information includes 16 parity bits corresponding to the 256 bits.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 9: An automotive memory system, including: a memory device including a plurality of memory cells configured to store data; and a host system coupled with the memory device and configured to communicate data over one or more data channels and error control information over a dedicated error control channel, the host system further including: an error control engine implementing a parity check matrix configured to reduce a likelihood that a value of the error control information is associated both with a single-bit error condition and a multiple-bit error condition.

Aspect 10: The automotive memory system of aspect 9, where the error control engine is configured to detect one or more errors in the data using the error control information and generate an error code based on detecting one or more errors in the data.

Aspect 11: The automotive memory system of aspect 10, where the error control engine is configured to determine whether an error in the data is a single-bit error or a multiple-bit error based at least in part on a value of the error code.

Aspect 12: The automotive memory system of aspect 11, where the parity check matrix is configured to provide a 100% error correction rate based on determining the error in the data is a single-bit error.

Aspect 13: The automotive memory system of any of aspects 11 through 12,where the parity check matrix is configured to provide a 100% rate for detecting the error in the data is a double-bit error.

Aspect 14: The automotive memory system of any of aspects 11 through 13,where the parity check matrix is configured to provide at least a 99.1% rate for detecting the error in the data is a triple-bit error.

Aspect 15: The automotive memory system of any of aspects 11 through 14,where the data includes 256 bits and the error control information includes 16 parity bits corresponding to the 256 bits.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily doped, degenerate) semiconductor region. The source and drain may be separated by a doped (e.g., lightly doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

generating, by an error control engine of a host device, error control information associated with a plurality of parity bits by applying a parity check matrix to data characterized by a plurality of data channels and a plurality of unit intervals, the parity check matrix indicating, for each parity bit of the plurality of parity bits, a respective set of data bits for generating the parity bit, wherein each of the respective sets of data bits includes multiple data channels in each of the plurality of unit intervals;

transmitting, to a memory device based at least in part on generating the error control information, the data over one or more data channels and the error control information over a dedicated error control channel;

receiving, from the memory device based at least in part on transmitting the data and the error control information, the data over the one or more data channels and the error control information over the dedicated error control channel; and generating, at the error control engine, second error control information by applying the parity check matrix to the data received from the memory device.

2. The method of claim 1, further comprising:

comparing the error control information to the second error control information based at least in part on generating the second error control information.

3. The method of claim 2, further comprising:

generating an error code based at least in part on comparing the error control information to the second error control information.

4. The method of claim 3, further comprising:

determining whether an error in the data is a single-bit error or a multiple-bit error based at least in part on a value of the error code.

5. The method of claim 4, further comprising:

correcting the error in the data based at least in part on determining the error in the data is the single-bit error.

6. The method of claim 4, further comprising:

determining the error in the data is the multiple-bit error.

7. The method of claim 6, wherein the error code is configured to indicate a triple-bit error not the single-bit error.

8. The method of claim 1, wherein the data comprises 256 bits and the error control information comprises 16 parity bits corresponding to the 256 bits.

9. The method of claim 1, wherein the parity check matrix is associated with a plurality of sub-matrices, each sub-matrix of the plurality of sub-matrices being associated with a respective unit interval of the plurality of unit intervals.

10. The method of claim 9, wherein:

each column of each sub-matrix of the plurality of sub-matrices indicates at least five data bits for generating the plurality of parity bits.

11. The method of claim 9, wherein:

for a first subset of the plurality of parity bits, each row of each of the plurality of sub-matrices includes the same data channels; and for a second subset of the plurality of parity bits, each row of each of the plurality of sub-matrices includes different data channels than each other row of the plurality of sub-matrices.

12. The method of claim 9, wherein a first subset of the plurality of sub-matrices are sparse matrices and a second subset of the plurality of sub-matrices are dense matrices.

13. The method of claim 1, wherein the plurality of parity bits includes a parity wrapper bit that is generated using each channel from each unit interval of the plurality of unit intervals.

14. An automotive memory system, comprising:

a memory device comprising a plurality of memory cells configured to store data characterized by a plurality of data channels and a plurality of unit intervals; and a host system coupled with the memory device and configured to communicate the data over one or more data channels and error control information, associated with a plurality of parity bits, over a dedicated error control channel, the host system further comprising:

an error control engine implementing a parity check matrix that indicates. for each parity bit of the plurality of parity bits, a respective set of data bits for generating the parity bit, wherein each of the respective sets of data bits includes multiple data channels in each of the plurality of unit intervals.

15. The automotive memory system of claim 14, wherein the error control engine is configured to detect one or more errors in the data using the error control information and generate an error code based on detecting the one or more errors in the data.

16. The automotive memory system of claim 15, wherein the error control engine is configured to determine whether an error in the data is a single-bit error or a multiple-bit error based at least in part on a value of the error code.

17. The automotive memory system of claim 16, wherein the parity check matrix is configured to provide a 100% error correction rate based on determining the error in the data is the single-bit error.

18. The automotive memory system of claim 16, wherein the parity check matrix is configured to provide a 100% rate for detecting the error in the data is a double-bit error.

19. The automotive memory system of claim 16, wherein the parity check matrix is configured to provide at least a 99.1% rate for detecting the error in the data is a triple-bit error.

20. An apparatus, comprising:

a controller associated with a host device, wherein the controller is configured to cause the apparatus to:

generate, by an error control engine of the host device, error control information associated with a plurality of parity bits by applying a parity check matrix to data characterized by a plurality of data channels and a plurality of unit intervals, the parity check matrix indicating, for each parity bit of the plurality of parity bits, a respective set of data bits for generating the parity bit, wherein each of the respective sets of data bits includes multiple data channels in each of the plurality of unit intervals; p2 transmit, to a memory device based at least in part on generating the error control information, the data over one or more data channels and the error control information over a dedicated error control channel; p2 receive, from the memory device based at least in part on transmitting the data and the error control information, the data over the one or more data channels and the error control information over the dedicated error control channel; and generate, at the error control engine, second error control information by applying the parity check matrix to the data received from the memory device.

* * * * *